United States Patent [19]

Liu et al.

[11] 4,225,433
[45] Sep. 30, 1980

[54] FILTRATION OF HOT WATER EXTRACTION PROCESS WHOLE TAILINGS

[75] Inventors: Joseph K. Liu, Edmonton; Stephen J. Lane, Calgary; Lubomyr M. Cymbalisty, Edmonton, all of Canada

[73] Assignees: Petro-Canada Exploration Inc., Calgary; Her Majesty the Queen in right of the Province of Alberta, Government of the Province of Alberta, Department of Energy and Natural Resources, Alberta Syncrude Equity, Edmonton; Ontario Energy Corporation, Toronto; Imperial Oil Limited, Toronto; Canada-Cities Service, Ltd., Calgary; Gulf Oil Canada Limited, Toronto, all of Canada

[21] Appl. No.: 947,996
[22] Filed: Oct. 2, 1978
[51] Int. Cl.³ .................. B01D 21/01; C02F 1/52
[52] U.S. Cl. .................. 210/702; 208/11 LE; 210/806
[58] Field of Search .................. 210/42 R, 51–54, 210/75; 208/11 LE, 11 R

[56] References Cited

U.S. PATENT DOCUMENTS

| 3,487,003 | 12/1969 | Baillie et al. | 210/42 R |
| 3,502,575 | 3/1970 | Hepp et al. | 210/42 R |
| 3,723,310 | 3/1973 | Lang et al. | 208/11 LE |
| 3,816,305 | 6/1974 | Schutte | 208/11 LE |

Primary Examiner—Thomas G. Wyse
Attorney, Agent, or Firm—Ernest P. Johnson

[57] ABSTRACT

Whole tailings are treated with a flocculant to cause fines to agglomerate with the coarse particles. The product is then vacuum filtered to separate the fines from the water.

3 Claims, 2 Drawing Figures (a)
TYPICAL WHOLE TAILINGS
COURSE PARTICLES (b)
TYPICAL WHOLE TAILINGS
FINE PARTICLES (C)
TYPICAL AGGOMERATED
PARTICLES PRODUCED BY
FLOCCULATION (a) TYPICAL WHOLE TAILINGS COURSE PARTICLES (b) TYPICAL WHOLE TAILINGS FINE PARTICLES (c) TYPICAL AGGOMERATED PARTICLES PRODUCED BY FLOCCULATION

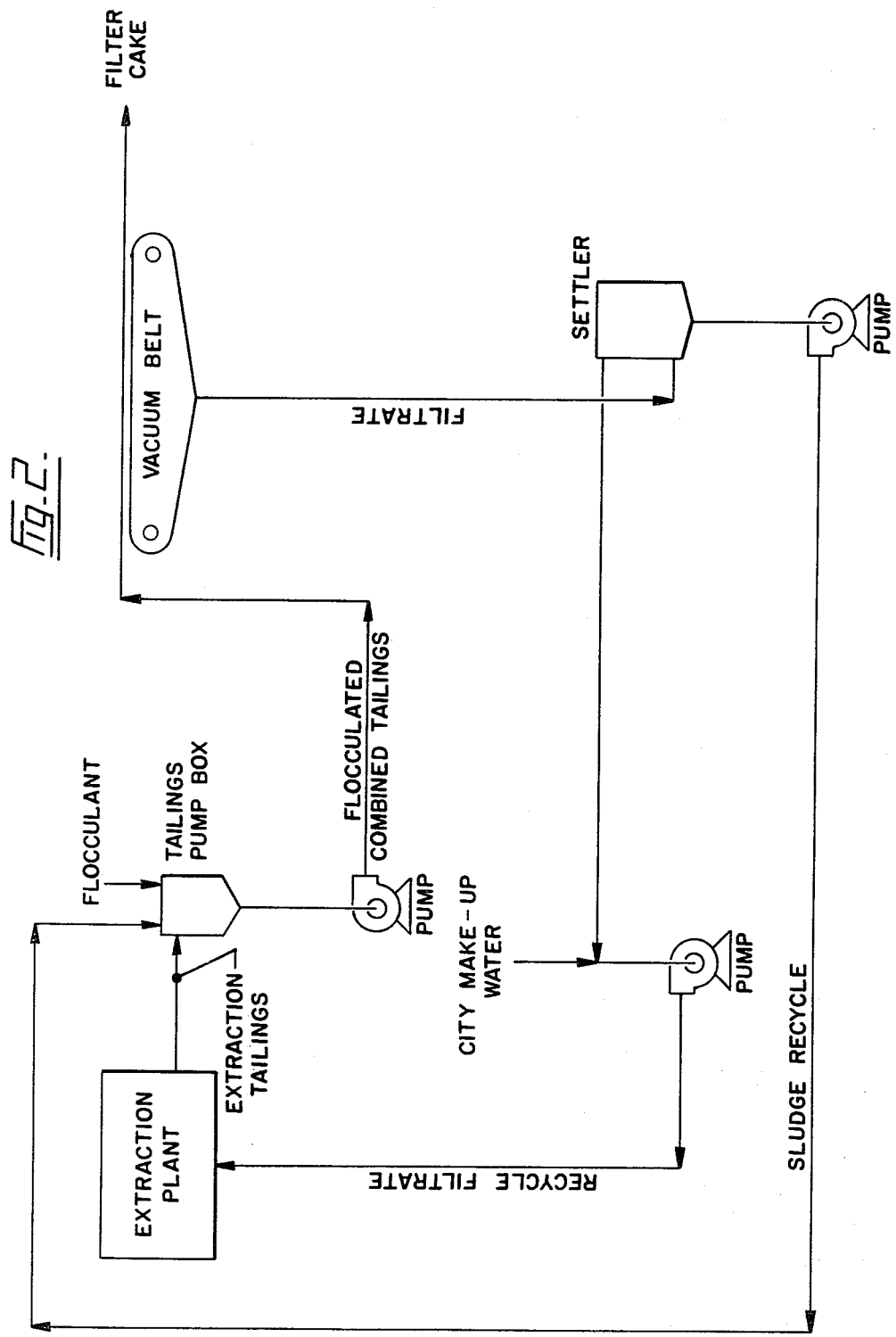

FILTRATION OF HOT WATER EXTRACTION PROCESS WHOLE TAILINGS

BACKGROUND OF THE INVENTION

This invention relates to a process for treating whole tailings from a hot water extraction process plant with the object of separating the water, contained in the tailings, from the greatest part of the contained solids.

The hot water extraction process is now well described in the literature. The process is used commercially in two very large plants to extract bitumen from the tar sand deposit located in the Athabasca area of Alberta, Canada. In general, the process involves: conditioning mined tar sand in a rotating drum by mixing it with hot water, steam and some NaOH; flooding the slurry from the conditioning drum with additional hot water; temporarily retaining the flooded slurry in a thickener—like primary separation vessel to produce separate streams of bitumen froth, concentrated sand tailings and dilute middlings; treating the middlings stream in a sub-aerated secondary recovery flotation cell to produce a second froth stream and a dilute tailings stream; combining the froth streams, diluting them with naphtha and then centrifuging the diluted froth in two stages to produce reasonably clean bitumen and a separate tailings stream.

Some or all of the various tailings streams so produced are normally combined and have heretofore been pumped to a pond where they are retained. Typically this combined tailings stream comprises 0.49% bitumen, 44.87% water and 54.64% mineral solids. Of the solids, about 12% are fine matter i.e. $-44\mu$. For purposes of this specification, this stream is hereinafter referred to as "whole tailings".

The problem of what to do with the whole tailings is one of the most serious ones facing this industry. It is necessary to clarify the water to a condition whereby it may be recycled through the extraction process. However, the rate of settling of the fines is inordinately slow. Since water used in the extraction process should not contain more than about 3% by weight fines, it has been found necessary to use gigantic settling ponds in order to provide sufficient retention time to permit the water to clarify to an acceptable level. By way of example, the larger of the two commercial plants, wich is designed to produce 125,000 B.O.P.D., has a proposed pond area of approximately 9 square miles. The ponds have to be surrounded by dikes which are expensive to construct. Furthermore, the ponds cover mineable tar sands and it has been estimated that to move their contents into the mined-out pits and thereby make these tar sands available for production would cost in the order of two billion dollars. From the foregoing, it will be appreciated that providing a feasible process for reducing the size of the ponds or eliminating them altogether is highly desirable.

Many different solutions to the problem have been proposed and are disclosed in patents. However to date none of them has had a significant effect on the commercial operation.

One process which at first glance may appear similar to the present invention is that disclosed in Canadian Pat. No. 892,548, issued to Hepp et al. Hepp teaches clarifying process water, i.e. settled pond water, by flocculating the fines with a known flocculating agent, such as lime, and then removing these flocculated solids from the stream by precoat vacuum filtration. The flocculated solids collect on the surface or in the interstices of the filter aid (which may be diatomaceous earth or the like) and will eventually blind the filter—thus the process requires shaving the blinded layer of filter aid to continuously expose a fresh surface for filtering. It is to be noted that the water being treated contains 0.1 to 1.5% bitumen and up to 20% mineral solids, of which 80–100% are fines; also the patent requires the use of a precoat filter medium on the filter.

Applicants gave consideration to applying the process of Pat. No. 892,548 to whole tailings but determined it was impractical, as practise of the technique would involve a large filtration area, a consequent large energy requirement, and the thin pre-coat filter cake would be unworkable with the feedstock, which is mainly coarse particles.

Experiments were subsequently carried out to determine if direct vacuum filtration of the whole tailings would work. These experiments were unsuccessful, as it was found that the coarse particles would naturally settle relatively quickly and would build up a thick porous filter cake—however the slower settling fines would gradually settle onto the surface of this cake and blind it, thereby effectively shutting off filtration.

Consideration was then given to the idea of flocculating the fines before filtering; however this suggestion was rejected, as it was felt the flocculant would mainly affect the fines to form relatively slow settling agglomerates which would still accumulate on the surface of the coarse particle filter cake and blind it.

Experiments were then conducted to investigate mechanically raking the surface of the filter cake to break up the blocking layer of fines. However, these experiments were also unsuccessful because it was not possible to produce a dry filter cake.

SUMMARY OF THE INVENTION

At this point, applicants then tried adding a flocculating agent to the whole tailings prior to direct filtration. Surprisingly it was found that fines and coarse particles agglomerated, with the result that the fines came down with the coarse particles and were generally uniformly distributed throughout the filter cake. (It is intended that the phrase "generally uniformly" be given a wide interpretation—in the case of direct filtration without previous flocculation, the fines were mainly concentrated at the surface of the filter cake, but some were distributed throughout the filter cake. In the case of flocculation followed by direct filtration, the fines associated with the filter cake were found, in the main, to be distributed throughout the filter cake, although this distribution is not precisely uniform, while some fines are concentrated at the filter cake surface. However, the concentration of fines in the second case is relatively insignificant and not seriously detrimental.) It has been found that, by practising flocculation followed by vacuum filtering, successful continuous filtration can be practised on a long term basis.

Broadly stated, in accordance with the invention there is provided a method for treating combined whole tailings from a hot water extraction process plant, said tailings including water, and coarse and fine solids, which comprises: mixing the tailings with a flocculating agent to agglomerate fine solids with coarse solids, whereby the fine solids co-settle with the coarse solids; and vacuum filtering the product to separate the water and solids.

DESCRIPTION OF THE DRAWINGS

FIG. 2 is a diagrammatic flow sheet showing the pilot plant embodiment incorporating the invention.

DESCRIPTION OF THE PREFERRED EMBODIMENT

As has previously been stated, the feedstock for the process is combined whole tailings from a hot water extraction process plant.

Known flocculating agents have been used—a number of them are set forth in Example I. We have worked particularly with calcium salts and have shown lime (CaO) to be the most beneficial—since it is readily available and inexpensive, it is therefore the preferred flocculant. The description following below of suitable conditions for flocculation have reference to this particular flocculant, for which operating parameters have been established.

The lime may be introduced by first mixing a slurry of lime and water, wherein the lime concentration is 10% by weight. This may be done in an agitated tank.

Sufficient lime slurry is added to the whole tailings to provide a CaO concentration in the mixture of between 300 and 700 ppm. If the tar sand feed to the extraction process is high in fines content, the concentration of CaO used in the flocculation step preferably should be at the high end of this range—if the fines content is average, the concentration preferably should be in the low end of the range.

A convenient way for mixing the whole tailings and the lime slurry involves adding the slurry to the tailings at a pump box and then pumping them together through a line to the vacuum filtration means. We have satisfactorily operated at 1½ minutes residence time of flocculant in tailings. It is recommended that severe agitation be avoided, as the agglomerates are relatively fragile and can break up, to the detriment of the process.

Figure 1:
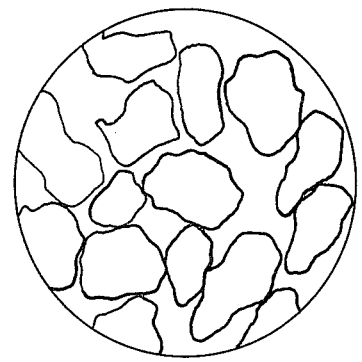
FIG. 1 is a fanciful drawing showing;
(a) typical whole tailings coarse particles;
(b) typical whole tailings fines particles; and
(c) typical agglomerate particles produced by flocculation.
Figure 1:
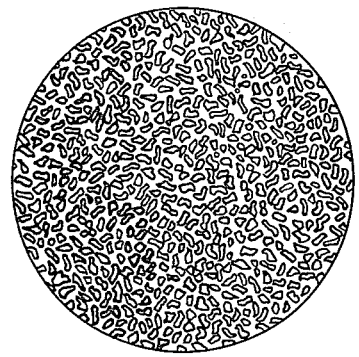
Figure 1:
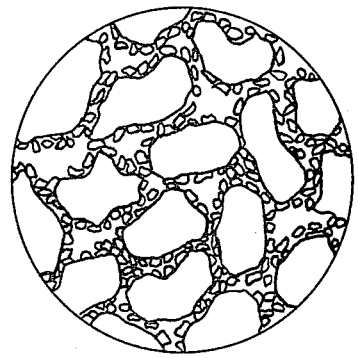

During this operation, a large proportion of the fines agglomerate with coarse particles to form agglomerates, a representative example of which is shown in FIG. 1.

The product stream is subjected to vacuum filtration to separate the water and solids. This may satisfactorily be done with a conventional belt vacuum filter. Good results have been obtained using a nylon belt having pores of 250 micron diameter. It is desirable to clean the cloth in its passage around the belt guide rollers to remove adhering bitumen. This may be done by flushing the underside of the cloth with hot water.

The work done has demonstrated that, by the practise of this process, the greatest part of the fines do form agglomerates with coarse particles. These agglomerates settle at a rate comparable to that of the coarse solids and thus the fines are found distributed fairly uniformly throughout the filter cake. The filter cake obtained is dry, typically containing in the order of about 15% by weight water, and the filtrate is low in solids, typically containing 4% by weight solids, and less than 3% fine solids.

The invention is illustrated by the following examples:

EXAMPLE I

This example describes a 24 hour pilot plant run carried out in accordance with the invention. The numerical values given are based on data from the 5th, 10th and 20th hours of operation.

The tailings feedstock consisted of a 5:1 mixture of primary and secondary tailings, which had themselves been produced from a hot water extraction process pilot plant. The feedstock composition was as follows:

| Component | Hour 5 | Hour 10 | Hour 20 |
|---|---|---|---|
| % oil | 0.89 | 1.01 | 0.65 |
| % water | 47.71 | 47.74 | 45.33 |
| % solids | 51.39 | 51.25 | 54.03 |

A slurry of lime and water was produced by mixing 40 pounds of commercial grade lime with 360 pounds of water. Mixing was performed in a vessel equipped with a high-speed agitator, with the lime added continuously to the water to prevent too rapid a temperature rise from the exothermic hydration, and stirring continued for about 15 minutes. The slurry and tailings were mixed by introducing the slurry into a tailings pump box. For accurate dosing the slurry was added via a double-piston, variable speed metering pump set to give a lime concentration of 700 ppm in the final mixture. The pump box was provided with an agitator, and the mixing action so provided together with pumping of the mixture through the pipework gave thorough but sufficiently gentle agitation for the desired flocculation. Total flocculating time was about 3½ minutes, divided between 2 minute residence in the pump box and 1½ minutes transfer time from pump box to filter. The temperature of the mixture was about 75° C.

The product was then continuously fed to an Eimco* belt filter, effective filtration area 10 square feet (10 feet long by 1 foot wide). Feed was added at about 4 tonnes/hr.

*Trade mark

| Condition | Hour 5 | Hour 10 | Hour 20 | | | |
|---|---|---|---|---|---|---|
| Belt speed (meters/min) | 7.62 | | 7.50 | | 7.32 | |
| Vacuum in filtrate receivers (kPa) | 52.3 | | 52.7 | | 52.3 | |
| Following are the results obtained from the belt filter: | | | | | | |
| Cake | Hour 5 | | Hour 10 | | Hour 20 | |
| Rate (kg/h) | 1878 | | 1968 | | 1848 | |
| % moisture | 14.5 | | 16.2 | | 13.9 | |
| Receivers | | | | | | |
| Filtrate | #1 | #2 | #1 | #2 | #1 | #2 |
| Rate (kg/h) | 1320 | 588 | 1061 | 822 | 1408 | 457 |
| % Solids (the values from #1 and #2 are averaged to give total solids re-cycled) | 4.7 | 0.86 | 5.02 | 0.83 | 4.99 | 0.12 |

EXAMPLE II

This example sets forth the results from testing various conventional flocculants in the process. The optimum level for each flocculant was determined in a batch-wise laboratory leaf filter. Then the pilot plant described in Example I was operated using the various flocculants at the same conditions as in Example I. Following are the results of the test:

| Chemical Addition | Filtrate 1 % Solids | Filtrate 2 % Solids | Combined % Solids | Cake* % Moisture |
|---|---|---|---|---|
| 500 ppm CaO | .38 | .15 | .34 | 14.4 |
| 150 ppm CaCl$_2$ | 2.76 | .24 | 2.25 | 15.4 |
| 150 ppm Al$_2$(SO$_4$)$_3$ | 1.36 | .18 | 1.12 | 17.4 |
| 150 ppm FeCl$_3$ | 2.38 | .17 | N/A | N/A |
| 500 ppm CaSO$_4$ | 3.68 | .57 | N/A | 20.13 |

*Average of 2 analyses

The embodiments of the invention in which an exclusive property or privilege is claimed are defined as follows:

1. A method for treating combined whole tailings from a hot water extraction process plant, said tailings including water, and coarse and fine solids, which comprises:
   mixing the whole tailings, without prior settling, with a flocculating agent to aggolmerate fine solids with coarse solids and co-settling the fine solids with the coarse solids; and
   immediately thereafter vacuum filtering the entire product without a filter aid to separate the water and solids.
2. The method as set forth in claim 1 wherein:
   the flocculating agent is lime.
3. The method as set forth in claim 2 wherein:
   the amount of lime added is sufficient to provide a concentration of 300 ppm to 700 ppm lime in the tailings-flocculant mixture.

* * * * *